United States Patent Office 2,821,494
Patented Jan. 28, 1958

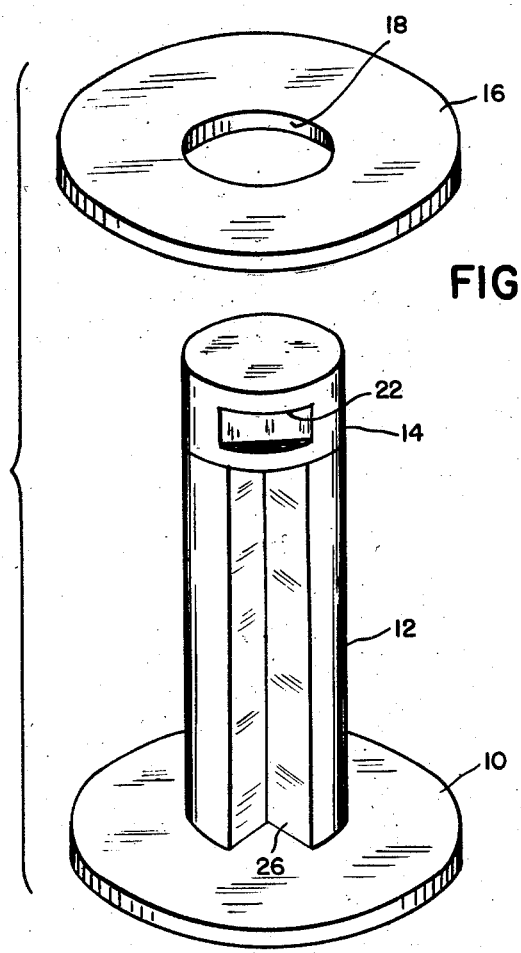
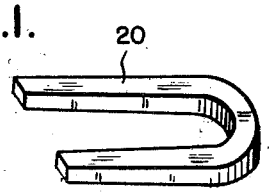
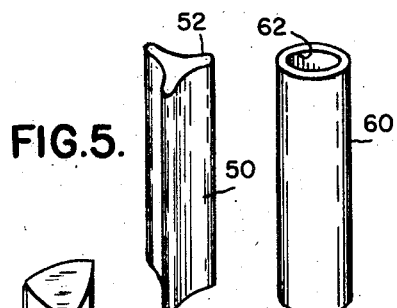
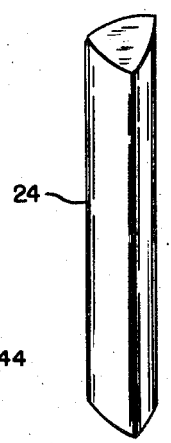
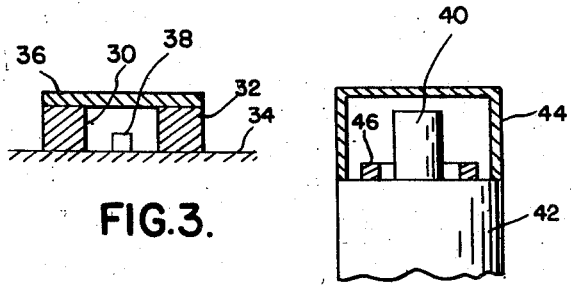
INVENTOR.
ROBERT M. WALKER JR.
BY Whittemore
Hulbert & Belknap
ATTORNEYS

2,821,494

METHOD FOR CONTROLLING CARBURIZATION

Robert M. Walker, Jr., Royal Oak, Mich., assignor of one-half to Angus M. Miller, Royal Oak, Mich.

Application July 3, 1953, Serial No. 366,027

9 Claims. (Cl. 148—16.5)

The present invention relates to a new product useful in controlling the content of carbon or other hardening agents in surface layers of ferrous articles and the method of employing such product.

The present invention is a continuation-in-part of my prior copending application Serial No. 288,687, filed May 19, 1952.

It is an object of the present invention to provide a new product useful in controlling the content of carbon or other hardening agents in surface layers of ferrous articles, such product comprising dry, rigid bodies comprising an intimate mixture of a finely divided oxidizing or decarburizing agent and an inert binder.

The new product controls the content of carbon or other hardening agent in surface layers of ferrous articles by one of two different actions. When used during a hardening operation, the product is placed in a restricted space within which the surfaces to be controlled are exposed. When the article is subjected to a carburizing or other hardening atmosphere, the product completely prevents or controls in a predetermined manner the hardening produced by the atmosphere. This action may be regarded as a controlled oxidizing of the active component of the atmosphere. Under different conditions the action of the new product is to decarburize or similarly remove hardening material from surface layers of a ferrous article. In view of these two specifically different actions the new product is referred to herein as an oxidizing-decarburizing agent.

More specifically, it is an object of the present invention to provide a product as described in the preceding paragraph in which the oxidizing-decarburizing agent is a metallic oxide and preferably a highly oxidized metallic oxide.

It is a further object of the present invention to provide a product as described in the preceding paragraph in which the oxidizing-decarburizing agent is red iron ore containing a substantial proportion of $Fe_2O_3$.

It is a further object of the present invention to provide a product as described in the preceding paragraphs in which the inert binder is a clay and preferably a china clay substantially free from carbonaceous materials.

It is a further object of the present invention to provide a product as described in the preceding paragraphs in which the product is specifically shaped to control the exposed surface area relative to the quantity of material therein.

It is a further object of the present invention to provide a product as described in the preceding paragraphs which is elongated and of uniform cross-section.

It is a further object of the present invention to provide a method for controlling surface characteristics of ferrous articles which comprises providing an enclosed space surrounding at least a predetermined selected surface area of the article within which space the selected surface area is exposed, providing within the enclosed space a dry, rigid body comprising an intimate mixture of an oxidizing-decarburizing agent and an inert binder, and heating the article to reactive temperature.

It is a further object of the present invention to provide a method of controlling the surface characteristics of a ferrous article which comprises providing a dry, rigid body including an oxidizing-decarburizing agent in an enclosed space surrounding a selected surface area of the ferrous article less than its entire surface area within which space the selected surface area is exposed, and heating the article in the presence of a hardening material to reactive temperature.

It is a further object of the present invention to carry out the method as described in the preceding paragraph in which the hardening material is contained in a carburizing or nitriding atmosphere.

It is a further object of the present invention to carry out the method as described in the preceding paragraphs in which the surface characteristics of the selected area of the article are controlled by controlling the quantity of oxidizing-decarburizing agent, its concentration in the body, the exposed surface area of the body in relation to the time cycle of the heating operation and the temperature employed so as to produce selectively a predetermined decarburization of the selected surface, a limited carburization thereof, or maintenance of its original surface composition.

Other objects and features of the invention will become apparent as the description proceeds, especially when taken in conjunction with the accompanying drawings, wherein:

Figure 1 is an exploded perspective view of a fixture used in practicing the present invention.

Figure 2 is a perspective view of a new article of manufacture employed in carrying out the method disclosed herein.

Figure 3 is a fragmentary sectional view of structure employed in practicing the present invention with an annular part.

Figure 4 is a fragmentary sectional view of structure employed in practicing the invention to protect a reduced shaft end.

Figure 5 is a perspective view of a modified shape of body.

Figure 6 is a perspective view of yet another modified shape of body.

The present invention in its broadest aspects relates to controlling the surface characteristics of ferrous articles, and more particularly, in a preferred form of the invention, of controlling the surface characteristics of predetermined selected surface areas of the article. In general, the invention comprises controlling the activity of the atmosphere in a confined space within which space a selected part or all of the surface area of the ferrous article is exposed while heating the article to a reactive temperature. Under predetermined selected conditions the surface area of the article exposed within such confined space is subjected to a decarburizing action. By effecting a controlled change in the conditions, the exposed surface area of the ferrous article may be maintained in its original condition while other portions of the article may be subjected to hardening treatment such for example as carburization or nitriding treatments.

Finally, by a control of conditions, the selected area of the article exposed within the confined space may undergo a hardening action of controlled degree which is less than the action resulting from the treatment of the remaining surface of the article.

In carrying out the invention, use is made of a new product of manufacture which comprises a dry, rigid body comprising an intimate mixture of a finely divided oxidizing-decarburizing agent and an inert binder. The oxidizing-decarburizing agent is preferably a metallic oxide and more particularly, a metallic oxide characterized by its high state of oxidation. Thus, the preferred oxidizing-decarburizing agent which is employed is red iron ore which may be essentially or which at least contains a substantial proportion of $Fe_2O_3$. However, other oxides of iron, manganese oxide, lead peroxide, mercuric oxide, copper oxide, or the like may be employed. In like manner, the inert binder may be any suitable inert material capable of producing a dry, rigid body which will maintain its form and thus facilitate handling both before and after the heat treatment. The preferred binder is clay and more particularly, china clay substantially free from carbonaceous material.

In preparing the bodies the oxidizing-decarburizing agent and inert binder are finely divided as by muddling and are mixed intimately to produce a substantially uniform mixture of the oxidizing-decarburizing agent and binder. The powdered mixture is moistened to a form-retaining consistency and is thereafter shaped as desired. Preferably, the shaping operation is an extruding operation which produces elongated bodies of uniform cross-section. However, it is within the scope of the present invention to provide bodies of other shapes, such for example as rings, tubes, pellets, or bodies of irregular surface contour.

Following the shaping of the mixture of oxidizing-decarburizing agent and binder, the bodies are baked to expel all moisture therefrom and to render them hard, strong, self-supporting bodies capable of being handled without fracture both before and after subjecting to the elevated heat treat temperatures. While the operation is facilitated in respect to handling the body or bodies in a particular operation by employing larger, shaped bodies, the invention includes within its scope the use of small granulated bodies which may be handled in bulk.

One aspect of the invention relates to the selective control of the surface characteristics of a predetermined surface area of a ferrous article while the remainder of the surface areas thereof are subjected to a surface hardening treatment. Thus for example, in the production of gears it is a common practice to subject the tooth surfaces to a carburizing, nitriding, or other treatment to harden these surfaces. At the time of such treatment, the gears normally are provided with central holes and these holes in many cases require further machining operations. Accordingly, it is highly desirable to carry out the hardening of the gear teeth while at the same time protecting other surfaces, such for example as spline hole surfaces in the parts, from the action of the hardening agent. In accordance with the present invention, and by employing the mechanism subsequently to be described, a plurality of such gears may be assembled together with the central holes thereof in alignment and provided with closure means for the ends of the aligned holes, thereby defining an enclosure within which the interior surfaces of the holes are exposed. Within this enclosure there is placed a body or bodies of the mixture of oxidizing-decarburizing agent and inert binder. The hardening operation involves a definite cycle in which the articles will be brought to a specific temperature and in which the operation is continued for a specific time. Having in mind the specific time temperature constants of the operation, along with the degree of hardening potential, and the degree to which the enclosed space is made resistant or impervious to admission of the carburizing or other hardening atmosphere, a body or bodies of selected content of oxidizing-dicarburizing agent with a proper proportion of oxidizing-decarburizing agent to inert material and surface area with respect to volume of the body or bodies, are placed within the enclosed space and the article or assembly of articles is then subjected to the heat treatment, such for example as carburization. By the selection of the proper characteristics of the body or bodies placed within the enclosed space, the surface characteristics of the articles exposed within such space may be controlled to a high degree of accuracy. In some cases, a limited hardening action of the surfaces exposed within the confined space may occur. In other cases, the action of the bodies within the space may be such as to prevent carburization or other hardening of the exposed surfaces without at the same time effecting any decarburization of such surfaces. In other words, the surfaces exposed within the confined space may be maintained without change in their original condition. Finally, by proper selection of the characteristics of the body or bodies placed within such confined space, the surfaces of the articles exposed therein may be subjected to a decarburizing action of predetermined degree. There is thus provided a method by means of which certain surfaces of ferrous articles may be subjected to a heat treatment such for example as carburization, while other surfaces thereof may be given entirely different characteristics which may include as limiting extremes, a predetermined degree of hardening or carburization, or a predetermined decarburization.

In carrying out the method it is not necessary for the body or bodies to contact the surfaces whose characteristics are being controlled, and in fact it is ordinarily desirable to maintain the bodies out of contact with such surfaces. However, due to the physical properties of the new product of manufacture, contact between such a body and the surface of the ferrous article is not at all harmful. This is to be contrasted with results which would be obtained if the oxidizing-decarburizing agent, as for example $Fe_2O_3$, were permitted to come into direct contact with a surface of the ferrous article. Under the elevated temperatures involved in the carburization of the ferrous parts, particles of the $Fe_2O_3$ would burn into the surface with undesirable or harmful results thereto. Moreover, the present invention permits the use of one or a few bodies within the enclosed space and the physical properties of these bodies are such that the bodies maintain shape and form during the heat treatment. Thus, it is a simple matter to remove the bodies following heat treatment.

Furthermore, the use of the bodies makes it an extremely simple and clean operation which is to be contrasted with prior attempts to prevent reaction with certain surfaces of work pieces by coating them or plugging openings into them with mud or the like. The operation is also to be compared with prior methods having as their objective the prevention of reaction with certain surfaces. Thus for example, in some cases it has been the practice to plate surfaces of the ferrous article to be protected with copper or other material, and thereafter to carry out the carburizing or other hardening operation. This method is of course relatively expensive and time consuming. More important however, it fails to obtain the results of the present invention in that at best it can serve only to prevent alteration of the protected surfaces, whereas in the present method the selected surfaces of the article may be hardened or decarburized to a selected and readily predictable degree. Finally, the method of plating the exposed parts is subject to the practical objection that it is impossible to obtain a uniform impervious plating in production with the result that carburization occurs in spots throughout the area supposedly protected by the plating. This of course produces hard spots in the surfaces, which in practice have been extremely destructive to tools used in subsequent machining operations.

Another application of the present invention is arresting and prevention of deterioration of ferrous articles subjected to repeated heating and cooling in an atmosphere containing carbon. A good example of this condition is in high temperature furnace parts and fixtures, such as trays, conveying equipment, etc., which are commonly made of high nickel chrome steel alloy. The material of these parts is relatively expensive and this alloy has been resorted to only for the purpose of producing articles having acceptable life expectancy. In practice, deterioration of the parts results from the appearance of extremely small imperceptible cracks therein in which carbon deposits accumulate. These carbon deposits being incompressible, result in extension of the cracks during cooling operations with further carbon built up during successive expansion of the cracks in heating. In many cases it is found that trays and fixtures of this type fail due to carbon pick-up and/or thermal shock. In the past it has been necessary to discard these parts when limited portions thereof deteriorate to a point rendering the part as a whole useless. In accordance with the present invention these parts may periodically be placed within a confined space in which is located one or a plurality of bodies of the new product disclosed herein and subjected to controlled heating operations. The result will be to decarburize the material, thus removing carbon previously picked up within the parent metal and/or in the small imperceptible cracks therein. If this operation is repeated at judicious intervals, deterioration of the various parts is effectively prevented.

As a variation of the foregoing, radiant tubes used as integral high temperature furnace parts may after substantial deterioration be decarburized and thus rendered suitable for repair operations which include welding new sections into the tubes. This has been impossible in the past since the carburized tubes were not suitable for welding.

Referring now to the drawings, Figure 1 illustrates apparatus designed for use in protecting the surfaces of holes in annular articles such as gears, during a carburizing operation. This apparatus comprises a flat plate 10 having an elongated central stem 12 extending therefrom terminating at its upper end in a head portion 14. Associated with the plate 10 and stem 12 is an annular plate 16 having an opening 18 therein adapted to receive the head 14. Means are provided for urging the annular plate or member 16 downwardly toward the plate 10 so as to apply axial pressure to an assembly of machine parts, such for example as gears, with the stem 12 extending through the central openings of the stacked gears. The means for urging the annular member 16 downwardly may take any convenient form but is herein illustrated as a key 20 cooperating with opposed slots 22 provided in the head, the key and slots being formed with a locking taper so that as the key is driven on, with the plate 18 therebelow, the plate is forced downwardly to produce a substantially air-tight or gas-slow resistant assembly of gears or other machine parts.

In carrying out the invention the oxidizing-decarburizing body may conveniently be provided in the form of an elongated body or stick of uniform cross-section such for example as illustrated at 24 in Figure 2.

Excellent results are obtained when the stem 12 is formed of non-circular cross-section such for example as by having axially extending recesses 26 formed in its sides to receive the oxidizing-decarburizing bodies. Conveniently, the oxidizing-decarburizing bodies may be shaped to conform substantially to the cross-sectional shape of the recesses 26. The cross-sectional shape of the stem 12 is such as to permit free circulation of air and gas within the enclosed opening within the assembly of gears or other machine parts.

In carrying out the method the decarburizing bodies are located within the recesses 26 in the stem 12, the assembly of gears is stacked in place over the stem, and the ends of the openings are effectively sealed by clamping annular member 16 against the uppermost gear of the stack. Thereafter, the assembly is subjected to the hardening process.

Referring now to Figure 3, there is illustrated a more general case in which the method is employed to protect the inner surface 30 of an annular machine part 32 from carburization or hardening. In this case the machine part 32 is rested on a support 34 and is provided with a closure plate 36 so that the combination of the support, machine part, and closure plate form an enclosed space of which the inner surface 30 of the machine element is a portion. Within the enclosed space there is provided an oxidizing-decarburizing element 38. The machine element 32 is then subjected ot the heat treating operation which may comprise heating it in the presence of a carburiizng gas. The presence of the oxidizing-decarburizing element 38 in the enclosed space prevents carburization of the inner surface 30 thereof and, as described in more detail above, may be eeffctive to reduce the carbon content at the inner surface of the element 32 if desired. Furthermore, this reduction in carbon content of the surface 30 may be controlled by selection of a particular size of oxidizing-decarburizing element.

Referring to Figure 4, there is illustrated the manner of protecting the reduced end 40 of a shaft 42 from hardening. In this case a cap 44 is placed over the end of the reduced portion 40 of the shaft, thus producing an enclosed space completely surrounding the surface of the machine part which is to be protected. Within the enclosed space defined by the cap 44 and the end of the shaft 42 is an oxidizing-decarburizing element 46 which in this particular instance is illustrated as provided in the form of a ring. The exact shape of the oxidizing-decarburizing element is not critical and the annular shape illustrated was selected primarily because of its convenience in the particular form of the invention described. The presence of the oxidizing-decarburizing element 46 in the enclosed space within the cap 44 prevents hardening of the reduced section 40 of the shaft and may, as described in detail above, actually reduce the carbon content at the surface of the reduced shaft section 40.

The present invention has been carried out with C–1020 steel having a carbon content of 0.18 to 0.23, a manganese content of 0.30 to 0.50, a maximum phosphorous content of 0.040, and a maximum sulphur content of 0.050. Splined gears, pinion gears, bearing races, etc., made from the above grade of steel, or its corresponding alloy grade would normally be gas carburized, gas carbonitrided, or pack carburized. After quenching from a temperature of between 1450 degrees Fahrenheit and 1750 degrees Fahrenheit, the carburized case transforms to an extremely hard material by virtue of the fact that the carbon content is increased to a certain depth, the increase in content ranging up to 1.25 to 1.30% generally. When this operation is carried out in accordance with the present invention the surface areas protected by the oxidizing-decarburizing medium remain relatively soft.

The invention has been practiced with C–1045 steel containing 0.40 to 0.50% carbon, 0.60 to 0.90% manganese, a maximum of 0.040% phosphorous, and a maximum of 0.50% sulphur. Splined gears, pinion gears, bearing races, etc., made from the above grade of steel, or its corresponding alloy grade would be gas carburized, gas carbonitrided, pack carburized, or hardened. After quenching from a temperature of between 1450 degrees Fahrenheit and 1750 degrees Fahrenheit, the carburized case transforms to an extremely hard material by virtue of the fact that the carbon content is increased to a certain depth, the amount of increase in content ranging up to about 1.25 to 1.30%. In some instances the metal section would be of such mass that the core hardness would quench to a harder material than desired for subsequent machining, broaching, or other form of cold working operation. By employing the oxidizing-decarburizing material as disclosed herein, the core hardness is reduced by an operation which includes decarburizing the core.

The invention may be carried out with C–1095 steel having 0.90 to 1.05 carbon, 0.30 to 0.50 manganese, a maximum of 0.040 phosphorous, and a maximum of 0.050 sulphur. Splined gears, pinion gears, bearing races, etc., made from the above grade of steel, or with certain alloying variations, would normally be processed at a temperature in the range of 1450 degrees Fahrenheit to 1750 degrees Fahrenheit, to obtain certain metallurgical properties on the wearing surfaces. In most instances there is little carbon added to the above material but it may be desirable to remove carbon from certain selected areas, such as splines or pilot ends or bores to facilitate subsequent machining, broaching, or other form of cold working operation. In this case the use of the oxidizing-decarburizing body operates to reduce the carbon content of the selected areas so as to produce machinable surfaces.

Thus, it will be seen that the use of the oxidizing-decarburizing bodies as disclosed herein may be used on low carbon steel to prevent surface hardening by preventing the action of hardening materials from being effective over these areas. In the case of high carbon steel the use of the oxidizing-decarburizing bodies as disclosed herein, prevents hardening of the selected areas during heat treatment by actually reducing the carbon content at these areas.

The oxidizing-decarburizing agent supplies oxygen for the purpose of combination with carbon which may be present in an ambient atmosphere or which may be removed from a ferrous article. The carbon may be in combination with other elements (as $Fe_3C$ in the ferrous part, or $CH_4$ in a carburizing atmosphere) and the reaction is dependent upon the relatively high affinity of the active ingredient of the present invention for carbon in its stable or combined forms.

The exact results obtained can of course be varied and accurately controlled by predetermining the percentage of iron oxide or other oxidizing-decarburizing agent included in the oxidizing-decarburizing sticks or bodies, and also of course by selecting the amount of oxidizing-decarburizing material introduced into the enclosed spaces by varying the size and number of sticks.

The proportion of the finely divided oxidizing-decarburizing agent to the inert material may vary widely. In some cases an extremely low proportion of the oxidizing-decarburizing agent may be employed. Thus for example, when the particular heat treatment involves a quicker heat and when it is desired to produce some but only a reduced hardening of the surfaces exposed within the confined space, good results have been obtained when the proportion of oxidizing-decarburizing agent to inert material is less than 1%. It appears obvious that in some cases the oxidizing-decarburizing agent may be present in the body in a proportion representing no more than a trace of material. As an upper limit, it is necessary to employ a sufficient proportion of binder to produce a solid rigid body and it is highly desirable that such body will retain its shape throughout the heat treatment. Present experience indicates that at least 10% of the inert binder is required for this purpose.

It is further highly desirable for the inert binder and oxidizing-decarburizing agent to be a consistent and uniform mixture throughout the body both to insure uniformity of results and also to avoid the possibility of cracking or fracture of the body due to differential expansion during the heat treatment. It is further considered essential for the bodies to be completely dry inasmuch as the presence of water vapor in the confined space would be completely unacceptable.

When employing the preferred form of the invention, in which the oxidizing-decarburizing agent is in the form of red iron ore, the bodies prior to use in the heat treat operation have a reddish color attributable to the red iron oxide. Following the heat treatment the bodies appear substantially the same except that their color has changed to black. An analysis of the bodies following typical heat treat operations indicates the conversion of the red iron ore to sponge iron. In some cases substantially all of the red iron ore is thus converted, whereas in other operations some of the red iron ore remains unconverted. In general, when a short cycle is employed in the heat treating operation it appears desirable to use a low concentration of oxidizing-decarburizing agent and to form the oxidizing-decarburizing bodies so that they have a relatively large area in proportion to the volume.

In Figure 5 there is illustrated an elongated body or stick 50 capable of production by extrusion which comprises a plurality of legs 52. Obviously, the ratio of the surface area to the volume of material in the body may be varied by making the legs 52 relatively thicker or thinner.

In Figure 6 there is illustrated another body 60 in the form of a tube having a central opening 62 therethrough. This body therefore has both an outer and inner surface and accordingly a high ratio of exposed area to mass of the material of which the body is composed.

As previously indicated, the bodies may be in the form of granular pellets or other shaped or unshaped bodies capable of being handled more or less as bulk material. Due to the composition of the bodies including at least substantial percentages of inert binder, these bodies do not exhibit any tendency to burn into the surface of the ferrous articles with which they may be in contact.

As is well understood, the temperatures to which the oxidizing-decarburizing bodies may be subjected may vary widely, as for example from 1000 to 2000 degrees Fahrenheit, depending upon the particular heat treat operation. Where the bodies are employed solely for the purpose of decarburizing all surfaces of an article the time-temperature constants of the operation may be selected in accordance with the composition, shape and area to mass ratio of the bodies. In other operations the time-temperature constants are determined by other considerations, in which case the characteristics of the body or bodies are governed thereby.

Another use of the present invention which may be mentioned is in the reclamation of articles which have been subjected to a case hardening treatment which results in an excessive case hardening. In such event the article may be heated to reactive temperature in an enclosed space in the presence of the oxidizing-decarburizing bodies so as to remove the case by recarburization or equivalent action. Thus, an article which after initial case hardening might be of no utility, is reclaimed and may be subjected to a second properly controlled treatment to provide the required case.

It will be appreciated that where the object to be attained by the practice of the present method is a controlled and reduced carburization or other hardening action of the surface of the ferrous article exposed within the confined space, the arrangement will be such as to permit some admission of the carburizing or other hardening atmosphere into the space containing the oxidizing-decarburizing bodies. Where the object of the invention is to maintain the selected surfaces of the articles without modification or to decarburize them, it is not necessary to provide for the admission of the carburizing or other atmosphere, but at the same time it is not necessary to go to particular extremes to prevent the admission of such atmosphere. In other words, using a uniform assembly of parts, the action may be controlled exclusively by the selection of the proper oxidizing-decarburizing body or bodies.

While the determination of the exact proper quantity of oxidizing-decarburizing agent, the proper proportion of oxidizing-decarburizing agent to inert binder, and the proper ratio of surface area to mass of the material of the body, for a particular operation may require some experimentation, reasonably accurate determination of these values may be made and subsequently adjusted as production proceeds. The operation is normally particularly useful in large production manufacture so that after determination of the exact characteristics of the body or bodies employed the operation may be duplicated over and over for thousands or hundreds of thousands of pieces.

The drawings and the foregoing specification constitute a description of the improved product and method for controlling carburization in such full, clear, concise and exact terms as to enable any person skilled in the art to practice the invention, the scope of which is indicated by the appended claims.

What I claim as my invention is:

1. The method of carburizing a ferrous article while producing a selected surface area thereof characterized by a substantially smaller carbon content which comprises providing an enclosed space surrounding the selected surface area within which space the selected surface area is exposed, providing within said space and out of substantial area contact with the said selected surface area a dry, rigid body comprising an intimate mixture of an oxidizing-decarburizing agent and an inert binder material, and heating the article in a carburizing atmosphere to reactive temperature.

2. The method of claim 1 which comprises controlling the quantity of active oxidizing-decarburizing material to obtain a lesser degree of carburization of the selected surface area than of the remainder of the surface of the article.

3. The method of claim 1 which comprises controlling the quantity of active oxidizing-decarburizing material to obtain a selected degree of decarburization of the selected surface area.

4. The method of claim 1 which comprises controlling the quantity of active oxidizing-decarburizing material to maintain the initial carbon content of the selected surface area substantially unchanged.

5. The method of arresting and preventing deterioration of ferrous articles subjected to repeated heating and cooling in an atmosphere containing carbon which comprises periodically heating the articles to reactive temperature in a confined space in which is provided out of substantial area contact with said articles a dry, rigid body comprising an intimate mixture of an inert binder material and an oxidizing-decarburizing agent.

6. The method of preventing carburization of central holes in annular machine parts which comprises stacking said parts to form a central space, placing in said space and out of substantial area contact with the hole surfaces a shaped rigid body composed of an oxidizing agent and an inert binder, closing the ends of said central space, and heating the assembly of parts in a carburizing atmosphere.

7. The method of preventing carburization of central holes in annular machine parts which comprises stacking said parts to form a central space, placing in said space and out of substantial area contact with the hole surfaces a shaped rigid body composed of iron oxide and an inert binder, closing the ends of said central space, and heating the assembly of parts in a carburizing atmosphere.

8. The method of selectively controlling carbon content of a first predetermined surface area of an article while carburizing a different predetermined surface area thereof which comprises forming an enclosure around said first predetermined area within which the said first predetermined area is exposed, providing in said enclosure and out of substantial area contact with said first predetermined surface area a shaped rigid body comprising a mixture of an oxidizing agent and an inert binder, and heating the article in the presence of a carburizing agent.

9. The method of selectively controlling carbon content of a first predetermined surface area of an article while carburizing a different predetermined surface area thereof which comprises forming an enclosure around said first predetermined area within which the said first predetermined area is exposed, providing in said enclosure and out of substantial area contact with said first predetermined surface area a shaped rigid body comprising a mixture including $Fe_2O_3$ and an inert binder, and heating the article in the presence of a carburizing agent.

References Cited in the file of this patent

UNITED STATES PATENTS

| | | |
|---|---|---|
| 206,889 | Madden | Nov. 30, 1877 |
| 460,105 | Benedict | Sept. 29, 1891 |
| 666,078 | Wanamaker | Jan. 15, 1901 |
| 1,042,999 | Burian | Oct. 29, 1912 |
| 1,394,055 | White | Oct. 18, 1921 |
| 1,716,191 | Schermer et al. | June 4, 1929 |
| 2,097,054 | Atwood | Oct. 26, 1937 |
| 2,398,809 | Snyder | Apr. 23, 1946 |

FOREIGN PATENTS

| | | |
|---|---|---|
| 11,138 | Great Britain | 1894 |